2,966,428

HEAT STABLE SAPONIFIED CELLULOSE ESTER FILAMENTARY MATERIAL AND PROCESS OF MAKING

Robert W. Singleton, Florham Park, and William B. Horback, Irvington, N.J., assignors to Celanese Corporation of America, New York, N.Y., a corporation of Delaware No Drawing. Filed Apr. 5, 1956, Ser. No. 576,249

13 Claims. (Cl. 117—136)

This invention relates to filamentary material and relates more particularly to the stabilization of high tenacity regenerated cellulose filamentary material produced by the saponification of stretched cellulose ester filaments.

As is known to the art, filamentary materials of regenerated cellulose of very high tenacity may be produced by the saponification of stretched cellulose ester filaments. These filamentary materials, hereinafter termed "saponified stretched cellulose ester filamentary materials," have been used extensively in many fields, e.g. for making sheer woven fabrics of high strength, and as reinforcing materials for industrial rubber products. On prolonged exposure to conditions of high temperature, however, these filamentary materials tend to become somewhat weakened.

It is therefore an object of this invention to improve the heat-resistance of saponified stretched cellulose ester filamentary materials.

Other objects of this invention will be apparent from the following detailed description and claims. In this description and claims all proportions are by weight unless otherwise indicated.

In accordance with one aspect of this invention the heat resistance of the saponified stretched cellulose ester material is improved by applying thereto a small proportion of an alkaline earth metal compound, such as a calcium, barium, strontium or magnesium compound. Preferably the alkaline earth metal compound is an ionizable salt of said metal and a carboxylic acid; for example, calcium lactate, strontium lactate or strontium salicylate. Good results have also been obtained by the use of the less soluble calcium hydroxide as well as water-insoluble materials such as calcium laurate, calcium undecylenate, calcium stearate and strontium caproate.

The amount of the alkaline earth metal compound applied to the saponified stretched cellulose ester filamentary material is preferably sufficient to provide at least about 0.5 gram millimole of alkaline earth metal per 100 grams of said filamentary material. A practical upper limit is about 20 gram millimoles of alkaline earth metal per 100 grams of said filamentary material.

The alkaline earth metal compound may be applied to the filamentary material in any convenient manner. Thus, when the alkaline earth metal compound is water-soluble it is sufficient merely to apply an aqueous solution of said alkaline earth metal compound to the filamentary material, as by dipping or spraying, and to dry the resulting wet filamentary material. Water-insoluble alkaline earth metal compounds may be applied similarly, as by the use of hot solutions thereof in organic solvents or by the use of suitable aqueous emulsions. Alternatively, the water-insoluble alkaline earth metal compound may be formed in situ on the filamentary material, as by passing the filamentary material through an aqueous solution of a water-soluble salt, e.g. sodium stearate, and then passing it through an aqueous bath of a water-soluble material reactive with said salt, e.g. calcium chloride. The use of water-insoluble alkaline earth metal compounds is advantageous in that the effect of the alkaline earth metal compound is retained even after soaking the filamentary material in water.

The application of the alkaline earth metal compounds of this invention to saponified stretched cellulose ester filamentary materials has the effect of markedly increasing their resistance to prolonged heating, as will be seen from the detailed data in the specific examples below. In contrast, the application of similar amounts of other materials previously suggested as stabilizers for other types of regenerated cellulose filamentary materials, e.g. diphenyl amine and p-cyclohexyl phenol which have previously been suggested as heat stabilizers for viscose rayon, has not been found to give any significant improvement in the heat stability of saponified stretched cellulose ester filamentary materials.

The high tenacity saponified stretched cellulose ester filamentary materials used in the practice of this invention may be produced in known manner from yarns of cellulose esters, preferably esters of carboxylic acids having 2 to 4 carbon atoms, best results being obtained from yarns of cellulose acetate. Stretching of the cellulose ester yarn may be accomplished by drawing the yarn to at least about 4 times, preferably 6 to 10 or even 20 times, its original length, in the presence of a stretch-assisting agent such as hot water or steam, which may be under superatmospheric pressure. Alternatively, the stretched cellulose ester yarn may be produced in known manner by a combined spinning and stretching operation in which a solution of the cellulose ester is extruded in filamentary form into a bath which is a coagulant for said solution and contains a swelling agent for the cellulose ester, the resultant filaments being stretched to the degree indicated above, while in said bath. These stretching processes cause the molecules of the cellulose ester to become highly oriented along the fiber axis. On substantially complete saponification of the stretched cellulose ester yarns there is produced a yarn of regenerated cellulose having a very high tenacity, i.e. a dry tenacity above 5.5 grams per denier and preferably about 8 grams per denier or higher. When wet, this regenerated cellulose material retains a high proportion of its dry strength; thus its wet tenacity may be above 70% of its dry tenacity.

The substantially complete saponification of the stretched cellulose ester yarns is preferably conducted in an aqueous solution of sodium hydroxide. Thereafter the saponified material, which contains a considerable proportion of alkali, is washed thoroughly. Washing may be carried out with ion-free or distilled water or with ordinary city water which may contain calcium ions, but in either case the subsequent application of the alkaline earth metal compound in accordance with this invention causes a marked improvement in the heat resistance of the material.

In contrast to the results obtained by the use of alkaline earth metal compounds, the presence of sodium compounds has an adverse effect on the heat resistance of the high tenacity saponified stretched cellulose ester filamentary materials. For example, when the filamentary material is washed in such a manner that it contains 0.4% residual NaOH, rather than the approximately 0.03% residual NaOH of a thoroughly washed material, its heat resistance, in the absence of alkaline earth metal compound, is adversely affected to a considerable extent.

The application of those alkaline earth metal compounds which are ionizable, e.g. calcium lactate, strontium lactate and strontium salicylate, has the further unexpected effect of significantly increasing the tensile strength of the high tenacity saponified stretched cellulose ester filamentary materials.

The following examples are given to illustrate this invention further:

Example I

A high-tenacity regenerated cellulose yarn is produced in known manner by continuously wet-spinning a solution of cellulose acetate into a spin bath having a swelling action on the cellulose acetate, stretching the resulting continuous filaments in the spin bath, and thereafter continuously completely saponifying the stretched filaments in an aqueous solution containing sodium hydroxide. The yarn is then washed in distilled water until its alkalinity, calculated as parts per million of sodium hydroxide, is reduced to below 300 p.p.m. and then dried, after which 2%, based on the weight of the yarn, of calcium lactate is applied to the yarn by dipping the yarn in an aqueous solution of calcium lactate followed by drying. The application of the calcium lactate results in a 4.5% increase in the tenacity of the yarn. The yarn is then aged in circulating air in an oven at a temperature of 130° C. for 8 days. A "control yarn," i.e. an identical yarn which has not been treated with calcium lactate, is subjected to the same aging conditions. At the end of the 8 day aging period the tenacity of the yarn carrying the calcium lactate is 80% of its value before the aging procedure, while the tenacity of the control yarn is less than 70% of the original tenacity of said control yarn.

Example II

Example I is repeated except that the yarn is washed with city water containing 20–40 p.p.m. of calcium ions instead of distilled water. The application of the calcium lactate results in a 2.6% increase in tenacity before aging. The results on aging of both the yarn containing calcium lactate and the control yarn are identical with those described in Example I.

Example III

Example I is repeated twice, using strontium salicylate and strontium lactate, respectively, instead of the calcium lactate. The increases in initial strength are 5.4% in the case of the salicylate and 3.4% when the strontium lactate is employed. On heat aging for 9 days at 130° C. the proportions of original tenacity retained are 70% for the yarn containing strontium salicylate, 67% for the yarn containing strontium lactate, and 58% for the control yarn.

Example IV

Example I is repeated four times, using different water-insoluble alkaline earth metal compounds, namely, calcium laurate, calcium undecylenate, calcium stearate and strontium caproate, in place of the calcium lactate. The water-insoluble alkaline earth metal compounds are applied to the yarn from solutions in hot benzene. The following table shows the proportion of the original tenacity retained after heat-aging of the control yarn and the yarns containing 2% of the water-insoluble alkaline earth metal compound:

|  | Percent Strength Retention After Heat Aging for Following Periods of Time at 130° C. | | | |
| --- | --- | --- | --- | --- |
|  | 4 days | 7 days | 12 days | 17 days |
| Calcium Laurate | 95 | 85 | 71 | 57 |
| Calcium Undecylenate | 99 | 88 | 70 | 61 |
| Calcium Stearate | 93 | 85 | 75 | 57 |
| Strontium Caproate | 94 | 85 | 70 | 50 |
| Control Yarn | 86 | 75 | 57 | 43 |

It is to be understood that the foregoing detailed description is merely given by way of illustration and that many variations may be made therein without departing from the spirit of our invention.

Having described our invention, what we desire to secure by Letters Patent is:

1. A substantially completely saponified stretched cellulose ester filamentary material containing an alkaline earth metal compound in solid state, the amount of said alkaline earth metal compound being above about 0.5 gram millimole of metal per 100 grams of said filamentary material, and being sufficient to improve the heat stability of said filamentary material.

2. Filamentary material as set forth in claim 1 in which the alkaline earth metal compound is a calcium salt of a carboxylic acid.

3. Filamentary material as set forth in claim 1 in which the alkaline earth metal compound is a strontium salt of a carboxylic acid.

4. Filamentary material as set forth in claim 1 in which the alkaline earth metal compound is a water-soluble salt of a carboxylic acid.

5. Filamentary material as set forth in claim 1 in which the alkaline earth metal compound is a water-insoluble salt of a carboxylic acid.

6. Filamentary material as set forth in claim 1 and in which the alkaline earth metal compound is water-soluble.

7. Process for the treatment of substantially completely saponified stretched cellulose ester filamentary material which comprises applying thereto an alkaline earth metal compound, the amount of said alkaline earth metal compound being above about 0.5 gram millimole of metal per 100 grams of said filamentary material and being sufficient to improve the heat resistance of said filamentary material.

8. Process as set forth in claim 7 in which said alkaline earth metal compound is strontium salicylate.

9. Process as set forth in claim 7 in which said alkaline earth metal compound is a calcium salt of a higher fatty acid.

10. Process as set forth in claim 7 in which said alkaline earth metal compound is strontium lactate.

11. Process as set forth in claim 7 in which said alkaline earth metal compound is a strontium salt of a higher fatty acid.

12. Process for the treatment of substantially completely saponified stretched cellulose ester filamentary material which comprises applying thereto calcium lactate in an amount above about 0.5 gram millimole of calcium per 100 grams of said filamentary material and sufficient to improve the heat resistance of said filamentary material.

13. A substantially completely saponified stretched cellulose ester filamentary material containing calcium lactate in solid state in an amount above about 0.5 gram millimole of calcium per 100 grams of said filamentary material, and sufficient to improve the heat stability of said filamentary material.

References Cited in the file of this patent

UNITED STATES PATENTS

| 2,038,723 | Dreyfus | Apr. 28, 1936 |
| 2,060,047 | Dreyfus et al. | Nov. 10, 1936 |
| 2,063,907 | Dreyfus et al. | Dec. 15, 1936 |
| 2,091,972 | Dreyfus et al. | Sept. 7, 1937 |
| 2,424,262 | Wainer | July 22, 1947 |
| 2,687,363 | Manning | Aug. 24, 1954 |